US010771363B2

(12) United States Patent
Beeram et al.

(10) Patent No.: US 10,771,363 B2
(45) Date of Patent: Sep. 8, 2020

(54) DEVICES FOR ANALYZING AND MITIGATING DROPPED PACKETS

(71) Applicant: Juniper Networks, Inc., Sunnyvale, CA (US)

(72) Inventors: Vishnu Pavan Beeram, Naperville, IL (US); Devang Patel, Chelmsford, MA (US); Raveendra Torvi, Nashua, NH (US)

(73) Assignee: Juniper Networks, Inc., Sunnyvale, CA (US)

( * ) Notice: Subject to any disclaimer, the term of this patent is extended or adjusted under 35 U.S.C. 154(b) by 29 days.

(21) Appl. No.: 15/994,778

(22) Filed: May 31, 2018

(65) Prior Publication Data

US 2019/0372873 A1    Dec. 5, 2019

(51) Int. Cl.
*H04L 12/26* (2006.01)
*H04L 12/24* (2006.01)
*H04L 12/703* (2013.01)
*H04L 12/823* (2013.01)

(52) U.S. Cl.
CPC ...... *H04L 43/0829* (2013.01); *H04L 41/0631* (2013.01); *H04L 41/0654* (2013.01); *H04L 45/28* (2013.01); *H04L 47/32* (2013.01)

(58) Field of Classification Search
CPC ........... H04L 2463/143; H04L 43/0829; H04L 41/0631; H04L 41/0654; H04L 45/28; H04L 47/32; H04L 12/56; H04L 47/243; H04L 47/2458; H04L 47/6215; H04L 47/6255; H04L 47/2441; H04L 47/6275; H04L 47/50; H04L 12/26; H04L 47/283; H04L 47/25; H04L 47/10; H04L 29/06; H04L 47/20; H04L 47/31; H04L 69/02; H04L 47/11; H04L 47/29; H04L 47/30; H04L 47/326; H04J 1/16; H04B 1/66
See application file for complete search history.

(56) References Cited

U.S. PATENT DOCUMENTS 8,605,588 B2    12/2013  Sankaran et al.
9,319,333 B2     4/2016  Swartzentruber
(Continued)

OTHER PUBLICATIONS

Extended European Search Report for Application No. EP19165383 dated Sep. 24, 2019, 8 pages.

*Primary Examiner* — Hardikkumar D Patel
(74) *Attorney, Agent, or Firm* — Harrity & Harrity, LLP

(57) ABSTRACT

A control device may subscribe to receive data from a network device. The data may be associated with a plurality of packets that have been dropped by the network device and include a first descriptor based on a type of packet drop associated with a packet of the plurality of packets that have been dropped by the network device, and one or more second descriptors based on a packet flow associated with the plurality of packets that have been dropped by the network device. The control device may determine a dropped packet profile associated with the network device, based on the first descriptor and the one or more second descriptors. The control device may generate a first notification based on the dropped packet profile associated with the network device and transmit the first notification to cause an action to be performed based on the first notification.

20 Claims, 9 Drawing Sheets

(56) References Cited

U.S. PATENT DOCUMENTS

| | | | | |
|---|---|---|---|---|
| 2007/0070907 A1* | 3/2007 | Kumar | ................... | H04L 47/30 370/235 |
| 2008/0279102 A1* | 11/2008 | Sankaran | ................ | H04L 49/50 370/235 |
| 2019/0332769 A1* | 10/2019 | Fralick | ...................... | H04L 9/30 |

* cited by examiner

DEVICES FOR ANALYZING AND MITIGATING DROPPED PACKETS

BACKGROUND

In packet data networks, packets are routed along a path between a packet source and a packet destination. Packet losses occur when one or more of the packets travelling through the network fail to reach the packet destination. Such losses may be attributed to the packets being dropped for any number of reasons, such as policies restricting the bandwidth or priority of traffic, network outages, deficient equipment, overloaded system conditions, and/or the like. Dropping packets may result in data errors, lost or degraded communication, and/or the like.

SUMMARY

According to some implementations, a method may include subscribing, by a control device, to receive data from a network device. The method may include receiving, by the control device, the data from the network device based on subscribing to receive the data from the network device. The data may be associated with a plurality of packets that have been dropped by the network device, and the data may include a first descriptor based on a type of packet drop associated with a packet of the plurality of packets that have been dropped by the network device, and one or more second descriptors based on a packet flow associated with the plurality of packets that have been dropped by the network device. The method may include determining, by the control device, a dropped packet profile associated with the network device. The dropped packet profile may be based on the first descriptor and the one or more second descriptors. The method may include generating, by the control device, a first notification based on the dropped packet profile associated with the network device and transmitting, by the control device, the first notification to cause an action to be performed based on the first notification.

According to some implementations, a device may include one or more memories, and one or more processors to receive data from a network device. The data may be associated with a plurality of packets that have been dropped by the network device, and the data may include a first descriptor based on a type of packet drop associated with one or more of the plurality of packets that have been dropped by the network device, and one or more second descriptors based on a packet flow associated with the plurality of packets that have been dropped by the network device. The one or more processors may determine a dropped packet profile associated with the network device. The dropped packet profile may be based on the first descriptor and the one or more second descriptors. The one or more processors may analyze the dropped packet profile to determine that additional data is needed, query the network device, or another network device, to obtain the additional data, receive the additional data based on querying the network device, or the other network device, and correlate the additional data and the dropped packet profile to determine a cause for dropping of the plurality of packets that have been dropped by the network device. The one or more processors may permit an action to be performed based on the cause for the dropping of the plurality of packets that have been dropped by the network device.

According to some implementations, a non-transitory computer-readable medium may store instructions that include one or more instructions that, when executed by one or more processors, cause the one or more processors to receive data from a network device. The data may be associated with a plurality of packets that have been dropped by the network device. The data may include a first descriptor based on a type of packet drop associated with a packet of the plurality of packets that have been dropped by the network device, and one or more second descriptors based on a packet flow associated with the plurality of packets that have been dropped by the network device. The one or more instructions may cause the one or more processors to determine a dropped packet profile associated with the network device. The dropped packet profile may be based on the first descriptor and the one or more second descriptors. The one or more instructions may cause the one or more processors to determine that additional data is needed based on analyzing the dropped packet profile, query the network device to obtain the additional data, correlate the additional data and the dropped packet profile to determine a cause for dropping of the plurality of packets that have been dropped by the network device, and cause the network device to perform an action based on the cause for the dropping of the plurality of packets that have been dropped by the network device.

DETAILED DESCRIPTION

Figure 1A:
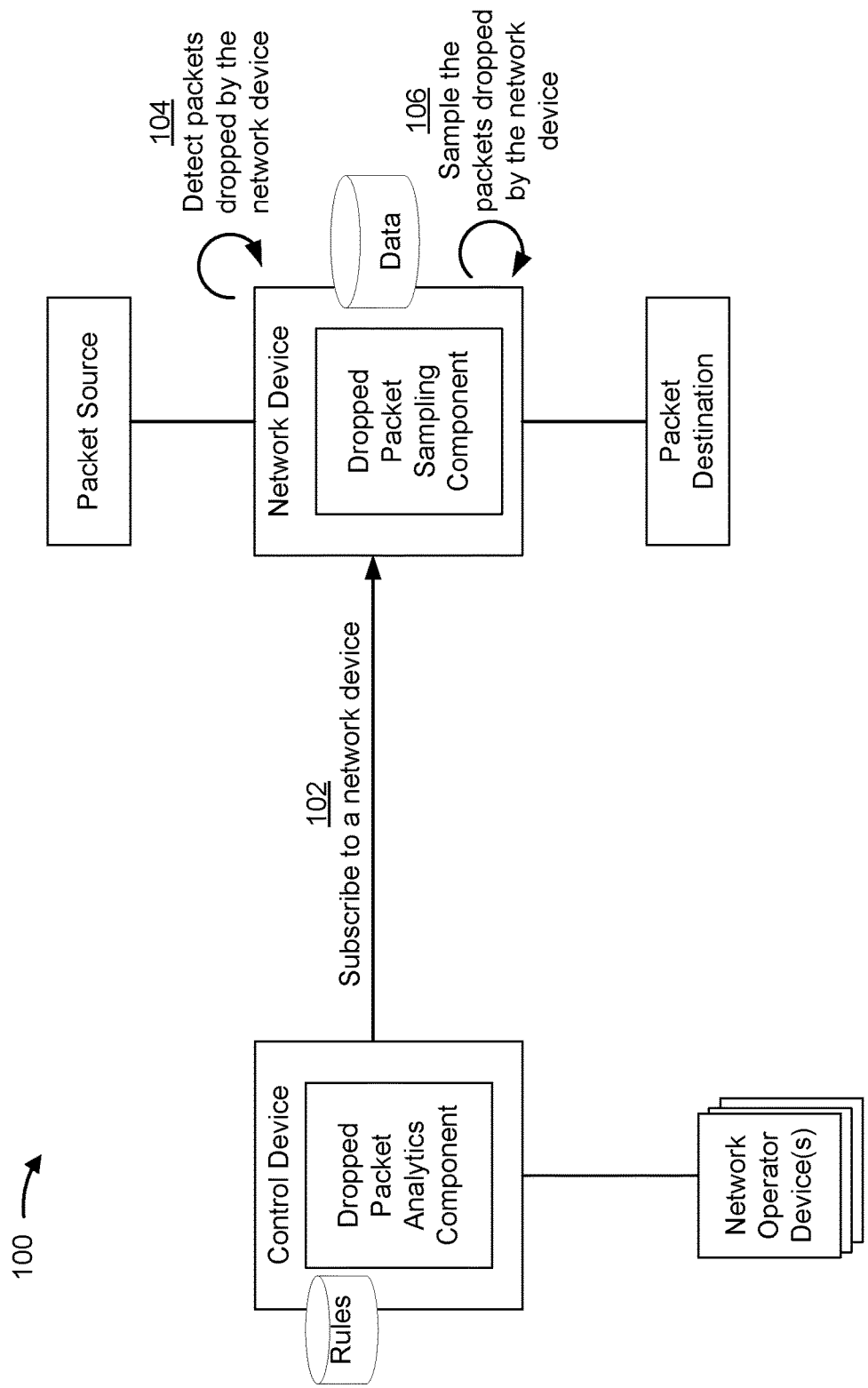
FIGS. 1A-1C are diagrams of an example implementation described herein.

The following detailed description of example implementations refers to the accompanying drawings. The same reference numbers in different drawings may identify the same or similar elements.

In a packet data network provided by a network operator, packets are routed between a packet source and a packet destination along a routing path. The packets may encounter multiple network devices (e.g., intermediate network devices) along the routing path between the packet source and the packet destination. Such network devices may forward or route the packets towards the packet destination based on information contained in packet headers of the packets. In some instances, the packets are dropped by a network device before being routed to a subsequent device. The packets may be dropped due to any one of several different reasons. For example, the packets may be dropped by the network device due to transient packet drop scenarios or persistent packet drop scenarios.

Transient packet drop scenarios may include, for example, situations in which the packets are dropped by the network device due to congestion at the network device or congestion in the network. On the other hand, persistent packet drop scenarios may include, for example, situations in which the packets are dropped by the network device due to a misconfiguration of the network device, a deficiency in hardware or software, a routing error, an error in the packet headers, and/or the like. Counters may be positioned at the network device for use in determining metrics relating to the packets that have been dropped by the network device. For example, the counters may count a number of packets that have been dropped by the network device during a specified time period. However, the counters do not provide an indication of whether the packets have been dropped due to transient packet drop scenarios or due to persistent packet drop scenarios. The counters also do not provide an indication of a packet flow (e.g., the sequence or flow of the packet between the packet source, intermediate network devices, the packet destination, etc.) of the packets that have been dropped by the network device.

Some implementations described herein provide a control device that is capable of processing, analyzing, and/or correlating data relating to packets that have been dropped by a network device to determine a cause of the dropping of the packets by the network device. The data relating to the packets that have been dropped by the network device may include a first descriptor of a type of packet drop associated with a packet that has been dropped by the network device. The type of packet drop indicates whether the packet is dropped due to a transient packet drop scenario or due to a persistent packet drop scenario. The data relating to the packets that have been dropped by the network device may further include one or more second descriptors based on the packet flow associated with the packets that have been dropped by the network device.

The control device may analyze and/or correlate the type of packet drop and the packet flow for the packets that have been dropped by the network device. In this way, the control device may determine a cause of the dropping of the packets by the network device and mitigate the cause by instructing the network device, or other network devices, to implement corrective actions. Furthermore, in this way, the control device may prevent additional packets from being dropped, prevent delays in the network, and improve the end-to-end performance of the network. Mitigating the dropping of the packets by the network device may further improve quality of service (QoS) in the network. In this way, the control device can mitigate both types of packet drop scenarios, including transient packet drop scenarios and persistent packet drop scenarios.

Figure 1B:
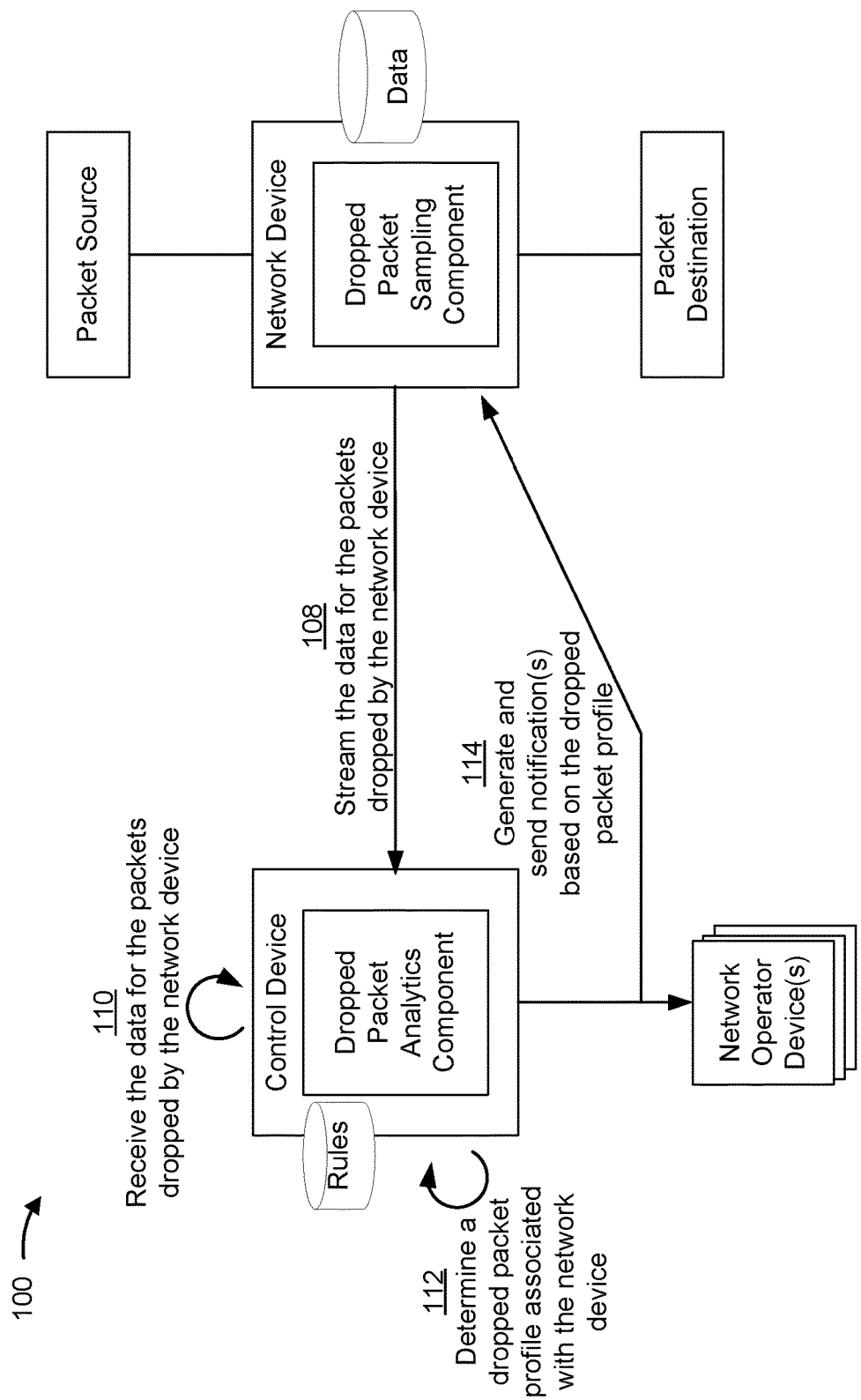
Figure 1C:
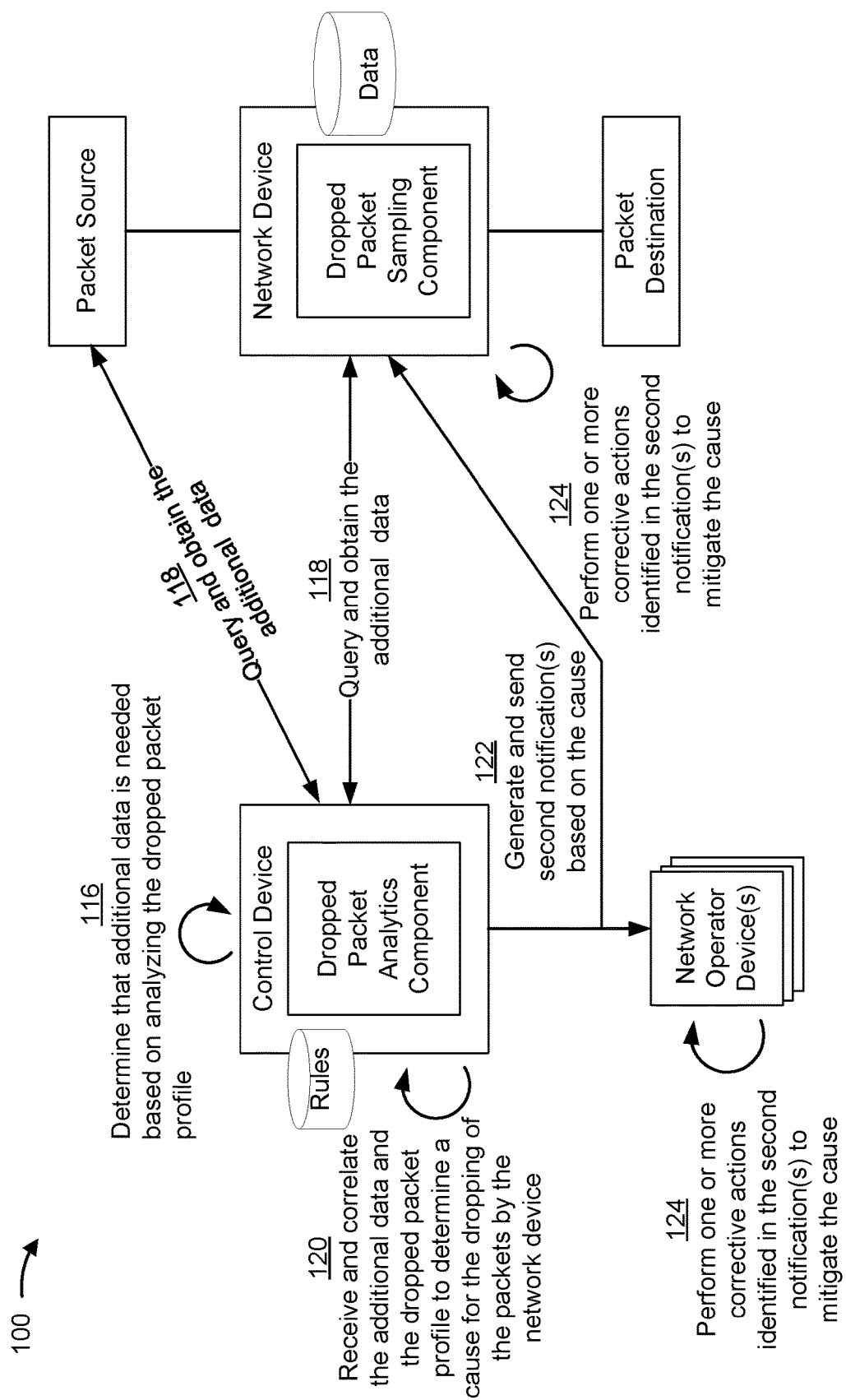

FIGS. 1A-1C are diagrams of an example implementation 100 described herein. As shown in FIGS. 1A-1C, example implementation 100 may include a control device having a dropped packet analytics component, a network device having a packet sampling component, one or more network operator devices, a packet source, and a packet destination. The network device is positioned between the packet source and the packet destination in a network provided by a network operator.

In some implementations, the control device, the network device, and the network operator devices may be included in a packet data network, such as a cellular network, a wide area network, a local area network, a telecommunications network, a private network, an intranet, the Internet, a cloud computing network, and/or the like. For example, the control device, the network device, and/or the network operator devices may be included in an edge of the network, in a backhaul of the network, in a core of the network, and/or the like.

In some implementations, the control device may be capable of detecting, receiving, analyzing, and/or correlating data received from the network device. Such data may be associated with packets that have been dropped by the network device. The control device may utilize the data received from the network device to determine a cause for dropping the packets at the network device. In this way, based on the cause for dropping of the packets at the network device, the control device may cause or implement one or more actions to be performed to mitigate the dropping of the packets as described herein.

In some implementations, the network device may facilitate packet routing between the packet source and the packet destination using information contained in the packets. For example, the network device may utilize information contained in a packet header of a packet to route the packet towards the packet destination and/or to a next hop. The information in the packet header may include, for example, a source identifier, a source port identifier, a destination identifier, a destination port identifier, a next hop identifier, a protocol identifier, and/or any other information that may be used to identify a packet flow of the packet through the network. As an example, and, in some implementations, the network device may facilitate packet routing in the network according to a Multi-Protocol Label Switching (MPLS) mechanism in which the packets are forwarded based on labels inserted in the packet header.

As shown in FIG. 1A, and by reference number 102, the control device may subscribe to the network device. In some implementations, the control device utilizes a network identifier associated with the network device to subscribe to the network device. Additionally, in some implementations, the control device may subscribe to receive specified data from the network device. For example, the control device may subscribe to receive data from the network device in response to the occurrence of an event, such as the occurrence of a dropping of a packet. In some implementations, the control device may subscribe to receive data that is associated with the packets that have been dropped by the network device. The control device may subscribe to receive information from one network device or multiple network devices in the network.

As further shown in FIG. 1A, and by reference number 104, the network device may detect packets being dropped by the network device. For example, the network device may include a dropped packet sampling component that detects a plurality of packets being dropped by the network device and samples the data from the plurality of packets being dropped by the network device. In some implementations, the dropped packet sampling component may detect the plurality of packets being dropped by the network device by detecting deficiencies in forwarding the packets by the network device. For example, the network device may include a forwarding component in which packets are forwarded from the packet source to or towards the packet destination. In some implementations, when the forwarding component is unable to forward the packet, the forwarding component may pass the packet to the dropped packet sampling component.

As further shown in FIG. 1A, and by reference number 106, the network device may sample the plurality of packets being dropped by the network device. For example, the network device may, using the dropped packet sampling component, sample data associated with the plurality of packets that have been dropped or discarded by the network device. The data that is sampled by the network device may also be stored in a memory device of the network device.

In some implementations, the network device may, using the dropped packet sampling component, sample data that includes at least a first descriptor based on a type of packet drop associated with packets of the plurality of packets being dropped by the network device. The type of packet drop may include an indication as to whether the plurality of packets is being dropped due to transient packet drop scenarios or persistent packet drop scenarios. In some implementations, the type of packet drop may be determined based on an error code associated with the plurality of packets being dropped by the network device. Example error codes may indicate whether the plurality of packets being dropped by the network device are due to a network error, a network outage, a routing error, a policy error, a firewall error, a transmission error, a cable deficiency, a deficiency in hardware, a deficiency in software, a deficiency in binding, a deficiency in packet labeling, or a deficiency in packet encapsulation.

In some implementations, the dropped packet sampling component may sample and store data for every packet being dropped by the network device. Additionally, or alternatively, the dropped packet sampling component may sample and store data for only a subset of the plurality of packets being dropped by the network device. For example, in some implementations, the dropped packet sampling component may sample and store data for packets associated with a specified type of packet drop, such as packets associated with the network error, the network outage, the routing error, the policy error, deficiencies in packet labeling, and/or the like. Sampling and storing data for only a subset of the plurality of packets may conserve memory resources at the network device relative to sampling and storing data for all of the plurality of packets.

In some implementations, the network device may, using the dropped packet sampling component, further sample data that includes one or more second descriptors of the packets based on the packet flow of packets in the plurality of packets that have been dropped by the network device. The second descriptors may include, for example, descriptors of the source identifier, the source port identifier, the destination identifier, the destination port identifier, the next hop identifier, and/or the protocol identifier of the plurality of packets being dropped by the network device.

As shown in FIG. 1B, and by reference number 108, the network device may transmit (e.g., stream) the data for the plurality of packets being dropped by the network device to the control device based on detecting the plurality of packets being dropped. The network device may stream all of the data that is sampled by the network device from the network device to the control device, or only a subset of the data that is sampled by the network device from the network device to the control device. In some implementations, the data being streamed by the network device to the control device may be raw data associated with the plurality of packets being dropped by the network device. For example, the network device may stream raw data obtained from the packet headers of the plurality of packets being dropped by the network device to the control device. In some implementations, the data associated with the plurality of packets being dropped by the network device may be streamed in real-time, or near real-time, as soon as a drop decision regarding each of the plurality of packets is made by the network device. In some implementations, the data associated with the plurality of packets being dropped by the network device may be transmitted to the control device in response to the passage of a predetermined amount of time, in response to collecting a predetermined amount of data (e.g., for a predetermined number of packets), in response to a request from the control device, and/or the like.

Additionally, or alternatively, the network device may transmit packet profiles (i.e., profiled data) associated with the plurality of packets being dropped by the network device to the control device based on detecting the plurality of packets being dropped. In some implementations, the network device may, when sampling the packet headers, create packet profile records based on a common packet flow associated with packets in the plurality of packets being dropped by the network device. For example, the network device may examine the packet headers associated with the plurality of packets being dropped by the network device and create the packet profile records for packets having the common packet flow so that the packet profile records may be more easily grouped, classified, manipulated, correlated, and/or the like, upon transmitting the data from the network device to the control device.

In some implementations, the packet profile records transmitted from the network device to the control device may contain information about the source identifier (e.g., a source IP address), the destination identifier (e.g., a destination IP address), port identifiers (e.g., a source port number, a destination port number, etc.), a protocol identifier, a number of bytes, other information from layer 3 and/or layer 4 of the packets, and/or the like. The packet profile records may be transmitted to the control device for use in determining a dropped packet profile associated with the network device. In some implementations, the creation of the packet profile records may be performed by the network device or a device accessible to the network device. Additionally, or alternatively, the creation of the packet profile records may be performed by the control device based on the raw data being streamed from the network device. Additionally, or alternatively, the creation of the packet profile records may be performed by a device that is separate from the network device and/or the control device. In some implementations, additional data associated with the packets being dropped by the network device that is not streamed by the network device may be stored by the network device. Such data may be subsequently accessed by the control device based on a query from the control device as described further below.

As further shown in FIG. 1B, and by reference number 110, the control device may receive the data (i.e., the raw data or the packet profile records) being transmitted from the network device. The data may be associated with the plurality of packets that have been dropped by the network device. In some implementations, the data received by the control device may include at least the first descriptor based on the type of the packet drop associated with the plurality of packets that have been dropped by the network device. For example, the type of the packet drop may be based on one or more error codes transmitted from the network device. In some implementations, the error codes may indicate if the type of the packet drop is attributed to a transient packet drop scenario or a persistent packet drop scenario, as described above. In some implementations, the first descriptor may indicate whether the type of packet drop is attributed to a network error, a network outage, a routing error, the policy error, a firewall error, a transmission error, a cable deficiency, a deficiency in hardware, a deficiency in software, a deficiency in binding, a deficiency in packet labeling, a deficiency in packet encapsulation, an input error, an output error, a framing error, a runt, another type of error, and/or the like.

Continuing with respect to reference number 110, the data received by the control device may further include the one or more second descriptors based on the packet flow associated with the plurality of packets that have been dropped by the network device as described above. In some implementations, the one or more second descriptors may be obtained from the raw data or the packet profile records transmitted by the network device. In some implementations, the one or more second descriptors may include one or more of the source identifier, the source port identifier, the destination identifier, the destination port identifier, the next hop identifier, or the protocol identifier for the plurality of packets that have been dropped by the network device.

As further shown in FIG. 1B, and by reference number 112, the control device may determine a dropped packet profile associated with the network device. In some implementations, the dropped packet analytics component of the control device may compare the first descriptors with the one or more second descriptors to determine the dropped packet profile associated with the network device. As an example, in some implementations, the first descriptors and the second descriptors are input into a dropped packet model implemented by the dropped packet analytics component. The dropped packet model may input the first descriptors and the second descriptors and identify commonalities existing in the data. For example, the dropped packet model may determine whether the packets that are dropped by the network device are of a same type (e.g., a same transient packet drop scenario or a same persistent packet drop scenario) based on the first descriptor, and, if so, whether the packets have a common flow. The dropped packet profile may be used to identify a problem for the dropping of the packets and determine what additional information or data, if any, is needed to determine the cause of the problem for the dropping of the packets. In some implementations, the dropped packet profile may include an aggregated form of the data received by the control device and may be used to indicate the presence or existence of a packet dropping scenario that requires further analysis and/or correlation to the network and/or additional network devices to determine a cause of the dropping of the packets by the network device.

As further shown in FIG. 1B, and by reference number 114, the control device may generate and send one or more notifications based on the dropped packet profile. The one or more notifications may be sent to the network device or to one or more network operator devices (e.g., management devices, management ports, control devices, etc.). For example, a notification may include a warning or alert that notifies the network device or a network operator device of the packet dropping scenario that requires further correlation to determine the cause of the dropping of the packets by the network device. In some implementations, the control device generates and sends a first notification to cause an action to be performed by the network device or the network operator device based on the first notification. As an example, the action may include the network device streaming additional data to the control device so that the control device may determine the cause associated with the dropping of the packets by the network device. As another example, the action may include altering the packet flow of packets having the same packet flow as the plurality of packets being dropped by the network device based on determining that the network device is deficient and/or until the cause associated with the dropping of the packets by the network device is diagnosed.

As shown in FIG. 1C, and by reference number 116, the control device may determine that additional data is needed based on analyzing the dropped packet profile. For example, the control device may determine that additional data is needed from the network device based on analyzing the dropped packet profile and performing a lookup in a data structure (e.g., table, database, repository, etc.) to determine that the additional that is needed. In some implementations, the control device accesses a rules repository to determine that a specific type of the additional data is needed. As an example, the control device may determine, based on a dropped packet profile, that the plurality of packets that have been dropped by the network device have a common label within the packet headers of the plurality of packets. The control device may access the rules repository and determine, based on a result of analyzing the dropped packet profile, that additional data is needed to determine which network device is responsible for inserting the faulty label.

As further shown in FIG. 1C, and by reference number 118, the control device may query and obtain the additional data from the network device or other related devices in the network (e.g., a packet source network device, a packet destination network device, a prior hop or next hop network device, and/or the like). In some implementations, the additional data may include data relating to a control plane on the network device or any other network device mapping to the network device based on analyzing the dropped packet profile. For example, upon analyzing the dropped packet profile, the control device may determine that a specific packet flow is dominant or distinguishable from other packet flows in the dropped packet profile. Based on the analysis of the dropped packet profile, the control device may access the rules in the rules repository by which the control device determines to request additional data. The additional data queried and obtained at reference number 118 may include data regarding a first list of network devices routing the plurality of packets that have been dropped by the network device to the network device, a second list of network devices implementing the packet flow associated with the plurality of packets that have been dropped by the network device, and/or a third list of network devices inserting labels, headers, or identifiers associated with the plurality of packets that have been dropped by the network device. In some implementations, the queries to obtain additional data may be made not just to the network device that reported the drop, but also to other network devices that can be mapped to a detected flow in the dropped packet profile.

As further shown in FIG. 1C, and by reference number 120, the control device may receive and correlate the additional data to the dropped packet profile to determine the cause for the dropping of the plurality of packets by the network device. For example, the control device may correlate the additional data with the dropped packet profile to determine that the cause is based on a deficient link or node mapping to the network device, to determine that the cause is based on the network device being misconfigured, to determine that the cause is based on a deficient cable, to determine that the cause is based on network delays or network congestion, to determine that the cause is based on a deficient interface, to determine that the cause is based on a deficient labeling or header information, and/or the like.

As shown in FIG. 1C, and by reference number 122, the control device may generate and send one or more second notifications based on the cause for dropping of the packets by the network device. In some implementations, a second notification may identify the cause for the dropping of the plurality of packets by the network device. In some implementations, the notification may include a corrective action to be performed by the network device or a network operator device to address the cause for the dropping of the packets. In some implementations, the second notification may be transmitted to the network device so that the network device can perform or implement the corrective action. In some implementations, the second notification may be transmitted to the network operator device so that the network operator device can perform or implement the corrective action.

As shown in FIG. 1C, and by reference number 124, the one or more corrective actions identified in the second notification may be performed by the network device and/or the network operator device. As an example, the network device may perform a corrective action by marking a link or node as deficient (e.g., in a routing table, in a forwarding table, in a next hop table, and/or the like). As a further example, the network device may perform a corrective action by marking an interface or port as deficient and thereafter discontinuing use of that interface or port. As a further example, the network device may perform a corrective action by changing a configuration, by rebooting, by taking itself offline, and/or the like. As a further example, the network operator device may perform a corrective action by disabling the network device (e.g., causing the network device to go offline or power down) or another network device. As a further example, the network operator device may perform a corrective action by causing the network device, or another network device, to be bypassed within the network (e.g., by causing one or more other network devices to bypass the network device). As a further example, the network operator device may perform a corrective action by causing traffic to be routed so that the traffic bypasses the network device, another network device, or a link that was identified as deficient (e.g., by causing the network device and/or another network device to be reconfigured, to update a forwarding table, a routing table, or a next hop table to bypass the network device, the other network device, or the link, to change a label switched path, and/or the like).

In this way, the control device can correlate the type of packet drop experienced by the plurality of packets that have been dropped by the network device and the packet flow associated with the plurality of packets that have been dropped by the network device. This enables the control device to determine and mitigate the cause of the dropping of the packets by the network device. Furthermore, in this way, detecting, correlating, and mitigating packets being dropped from the network device will improve the QoS in the network, the end-to-end performance, and the network efficiency. By mitigating the cause of the dropping of packets by the network device, the control device further reduces delays in the network.

As indicated above, FIGS. 1A-1C are provided merely as an example. Other examples are possible and may differ from what was described with regard to FIGS. 1A-1C.

Figure 2:
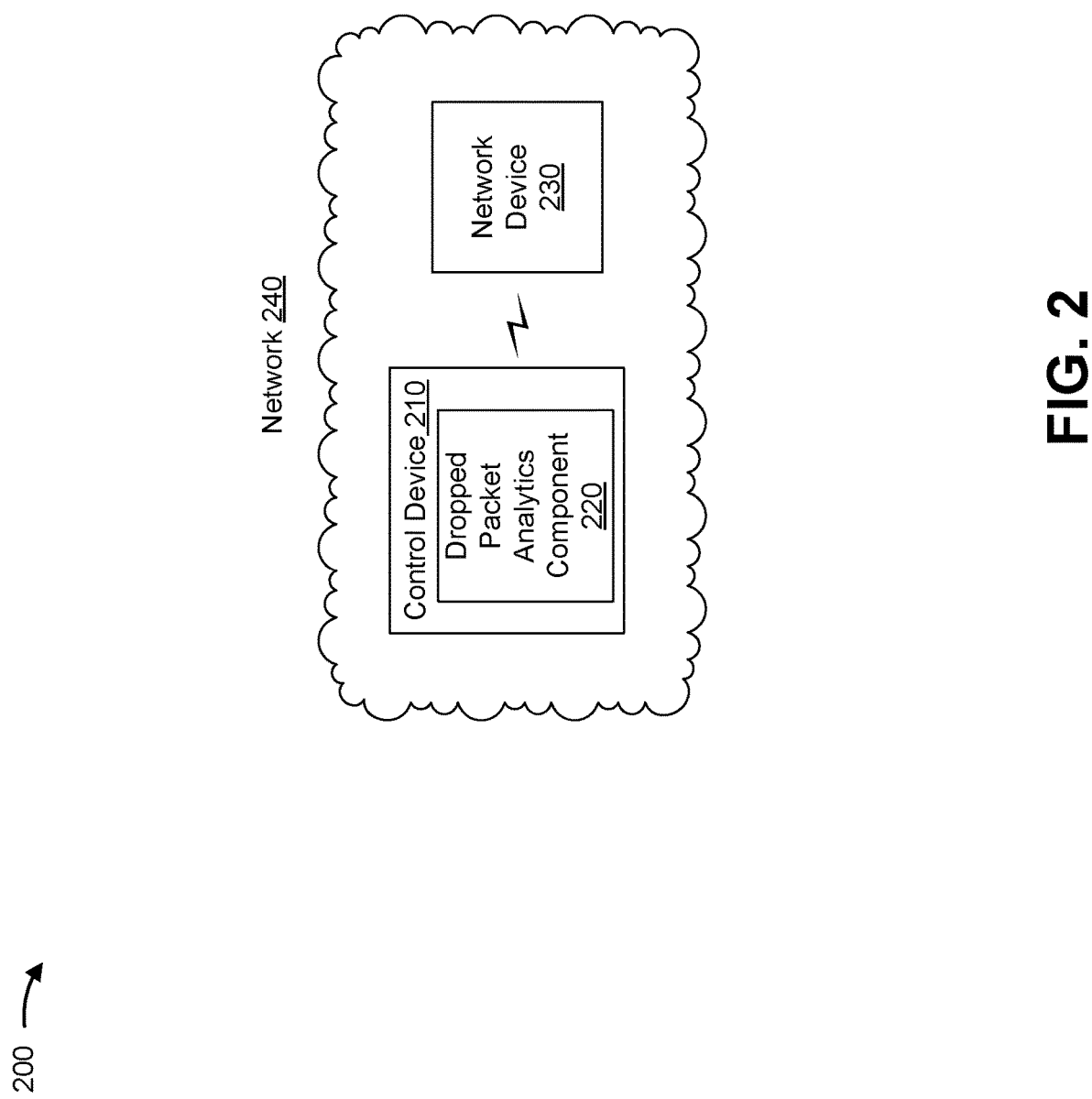
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a control device 210 with a dropped packet analytics component 220, a network device 230, and a network 240. Devices of environment 200 may interconnect via wired connections, wireless connections, or a combination of wired and wireless connections.

Control device 210 includes one or more devices capable of processing, analyzing, determining, detecting, and/or correlating information associated with analyzing and mitigating dropped packets. Control device 210 may further include one or more devices capable of notifying, controlling, and/or instructing network device 230 and/or one or more network operator devices (e.g., FIGS. 1A-1C) to implement actions for detecting and/or mitigating the dropped packets. In some implementations, control device 210 may include a server device, a group of server devices, or a similar type of device, which may receive information from and/or transmit information to network device 230. In some implementations, control device 210 may be a physical device implemented within a housing, such as a chassis. In some implementations, control device 210 may be a virtual device implemented by one or more computer devices of a cloud computing environment or a data center.

Dropped packet analytics component 220 includes one or more components capable of receiving, analyzing, processing, correlating, and/or transmitting information in regard to detecting and/or mitigating dropped packets. In some aspects, dropped packet analytics component 220 may be implemented by a processor of control device 210. In some implementations, dropped packet analytics component 220 may include one or more processors for performing one or more processes described herein, such as receiving, processing, analyzing, correlating, and/or transmitting data needed to determine the cause for dropping of packets by network device 230. In some implementations, dropped packet analytics component 220 may cause network device 230 to perform one or more actions to mitigate dropped packets.

Network device 230 includes one or more devices (e.g., one or more traffic transfer devices) capable of processing and/or transferring traffic between endpoint devices. For example, network device 230 may include a firewall, a router, a switch, a gateway, a firewall device, a modem, a hub, a bridge, a network interface controller (NIC), a reverse proxy, a server (e.g., a proxy server), a multiplexer, a security device, an intrusion detection device, a load balancer, or a similar device. In some implementations, network device 230 may be a physical device implemented within a housing, such as a chassis. In some implementations, network device 230 may be a virtual device implemented by one or more computer devices of a cloud computing environment or a data center.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a communications network, a telecommunications network, a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
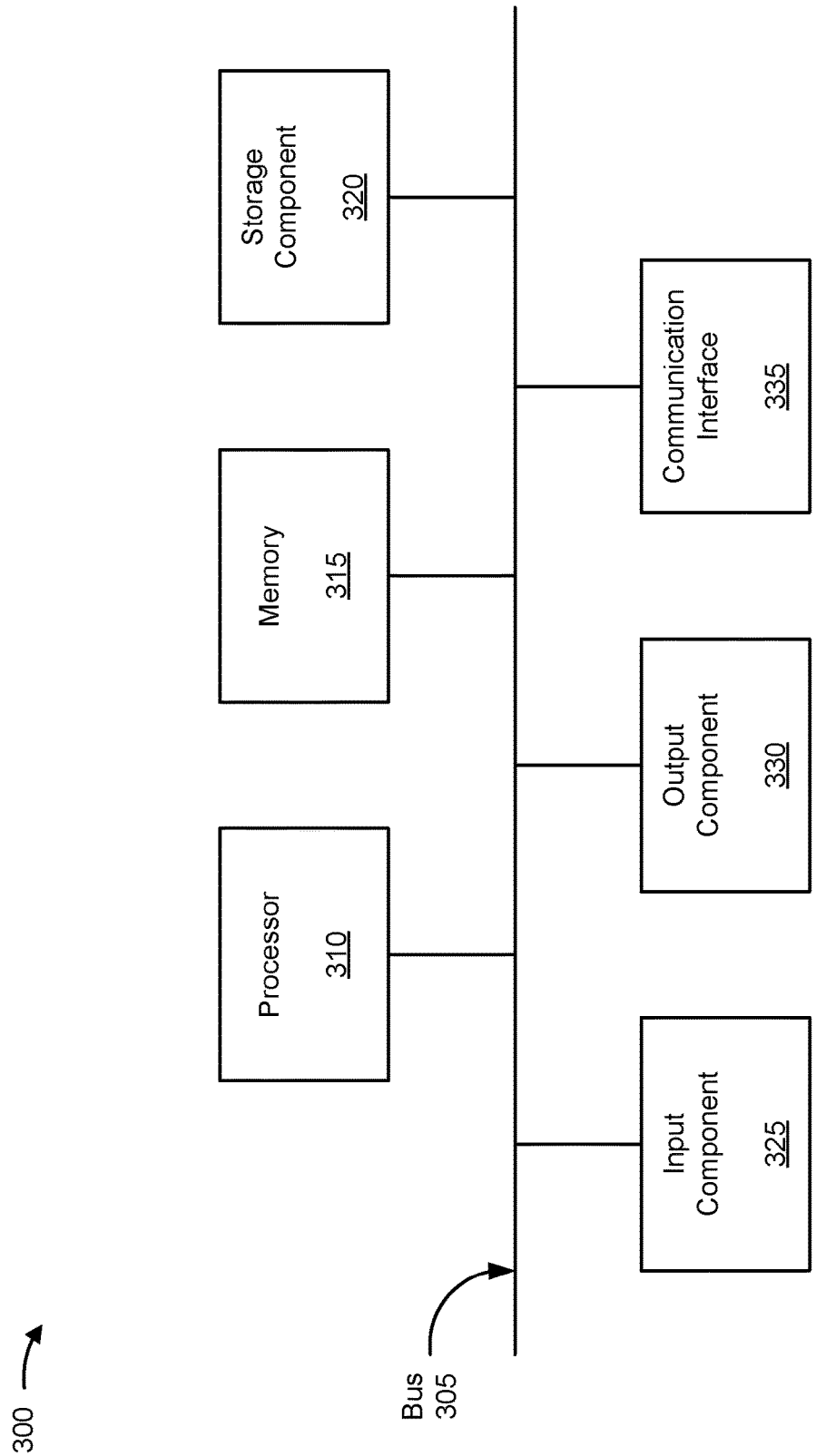
FIGS. 3A-3B are diagrams of example components of one or more devices of FIG. 2.
Figure 3B:
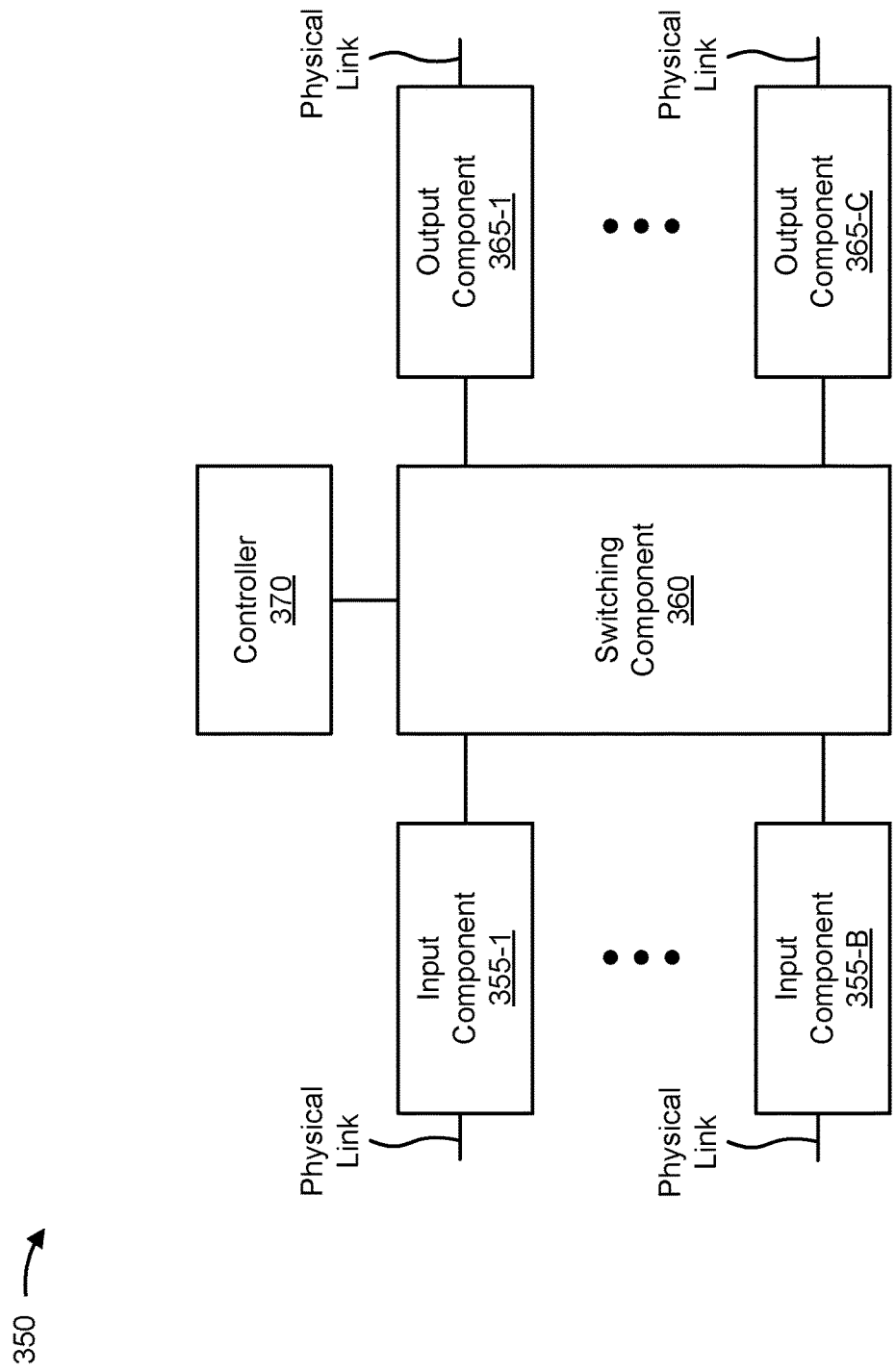

FIGS. 3A-3B are diagrams of example components of one or more devices of FIG. 2. FIG. 3A is a diagram of example components of a device 300. Device 300 may correspond to control device 210. In some implementations, control device 210 and/or dropped packet analytics component 220 may include one or more devices 300 and/or one or more components of device 300. As shown in FIG. 3A, device 300 may include a bus 305, a processor 310, a memory 315, a storage component 320, an input component 325, an output component 330, and a communication interface 335.

Bus 305 includes a component that permits communication among the components of device 300. Processor 310 is implemented in hardware, firmware, or a combination of hardware and software. Processor 310 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 310 includes one or more processors capable of being programmed to perform a function.

Memory 315 includes a random access memory (RAM), a read only memory (ROM), and/or another type of dynamic or static storage device (e.g., a flash memory, a magnetic memory, and/or an optical memory) that stores information and/or instructions for use by processor 310.

Storage component 320 stores information and/or software related to the operation and use of device 300. For example, storage component 320 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 325 includes a component that permits device 300 to receive information, such as via user input (e.g., a touch screen display, a keyboard, a keypad, a mouse, a button, a switch, and/or a microphone). Additionally, or alternatively, input component 325 may include a sensor for sensing information (e.g., a global positioning system (GPS) component, an accelerometer, a gyroscope, and/or an actuator). Output component 330 includes a component that provides output information from device 300 (e.g., a display, a speaker, and/or one or more light-emitting diodes (LEDs)).

Communication interface 335 includes a transceiver-like component (e.g., a transceiver and/or a separate receiver and transmitter) that enables device 300 to communicate with other devices, such as via a wired connection, a wireless connection, or a combination of wired and wireless connections. Communication interface 335 may permit device 300 to receive information from another device and/or provide information to another device. For example, communication interface 335 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 310 executing software instructions stored by a non-transitory computer-readable medium, such as memory 315 and/or storage component 320. A computer-readable medium is defined herein as a non-transitory memory device. A memory device includes memory space within a single physical storage device or memory space spread across multiple physical storage devices.

Software instructions may be read into memory 315 and/or storage component 320 from another computer-readable medium or from another device via communication interface 335. When executed, software instructions stored in memory 315 and/or storage component 320 may cause processor 310 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform one or more functions described as being performed by another set of components of device 300.

FIG. 3B is a diagram of example components of a device 350. Device 350 may correspond to network device 230. In some implementations, network device 230 may include one or more devices 350 and/or one or more components of device 350. As shown in FIG. 3B, device 350 may include one or more input components 355-1 through 355-B (B≥1) (hereinafter referred to collectively as input components 355, and individually as input component 355), a switching component 360, one or more output components 365-1 through 365-C (C≥1) (hereinafter referred to collectively as output components 365, and individually as output component 365), and a controller 370.

Input component 355 may be points of attachment for physical links and may be points of entry for incoming traffic, such as packets. Input component 355 may process incoming traffic, such as by performing data link layer encapsulation or decapsulation. In some implementations, input component 355 may send and/or receive packets. In some implementations, input component 355 may include an input line card that includes one or more packet processing components (e.g., in the form of integrated circuits), such as one or more interface cards (IFCs), packet forwarding components, line card controller components, input ports, processors, memories, and/or input queues. In some implementations, device 350 may include one or more input components 355.

Switching component 360 may interconnect input components 355 with output components 365. In some implementations, switching component 360 may be implemented via one or more crossbars, via busses, and/or with shared memories. The shared memories may act as temporary buffers to store packets from input components 355 before the packets are eventually scheduled for delivery to output components 365. In some implementations, switching component 360 may enable input components 355, output components 365, and/or controller 370 to communicate.

Output component 365 may store packets and may schedule packets for transmission on output physical links. Output component 365 may support data link layer encapsulation or decapsulation, and/or a variety of higher-level protocols. In some implementations, output component 365 may send packets and/or receive packets. In some implementations, output component 365 may include an output line card that includes one or more packet processing components (e.g., in the form of integrated circuits), such as one or more IFCs, packet forwarding components, line card controller components, output ports, processors, memories, and/or output queues. In some implementations, device 350 may include one or more output components 365. In some implementations, input component 355 and output component 365 may be implemented by the same set of components (e.g., and input/output component may be a combination of input component 355 and output component 365).

Controller 370 is implemented in hardware, firmware, or a combination of hardware and software. Controller 370 includes a processor in the form of, for example, a CPU, a GPU, an APU, a microprocessor, a microcontroller, an FPGA, an ASIC, and/or another type of processor. In some implementations, controller 370 may include one or more processors that can be programmed to perform a function.

In some implementations, controller 370 may include a RAM, a ROM, and/or another type of dynamic or static storage device (e.g., a flash memory, a magnetic memory, an optical memory, etc.) that stores information and/or instructions for use by controller 370. In some implementations, controller 370 may further store packet data (e.g., header data), packet information, packet profiles, and/or additional data used for use in correlating data to determine a cause of dropping of the packets by network device 230 upon a query from control device 210.

In some implementations, controller 370 may communicate with other devices, networks, and/or systems connected to device 300 to exchange information regarding network topology. Controller 370 may create routing tables based on the network topology information, create forwarding tables based on the routing tables, and forward the forwarding tables to input components 355 and/or output components 365. Input components 355 and/or output components 365 may use the forwarding tables to perform route lookups for incoming and/or outgoing packets.

Controller 370 may perform one or more processes described herein. Controller 370 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 370 from another computer-readable medium or from another device via a communication interface. When executed, software instructions stored in a memory and/or storage component associated with controller 370 may cause controller 370 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3B are provided as an example. In practice, device 350 may include additional components, fewer components, different components, or differently arranged components than those shown in FIG. 3B. Additionally, or alternatively, a set of components (e.g., one or more components) of device 350 may perform one or more functions described as being performed by another set of components of device 350.

Figure 4:
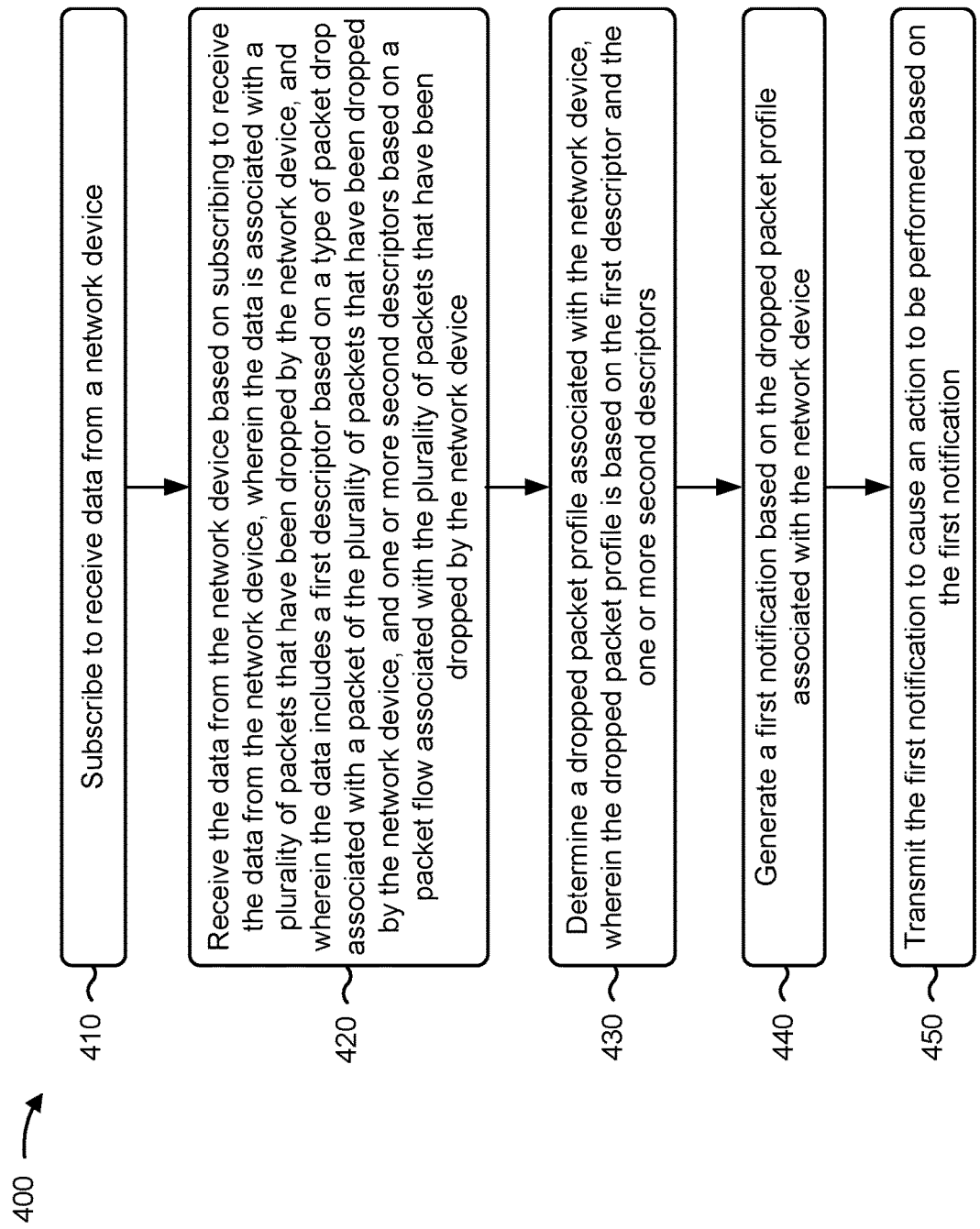
FIG. 4 is a flow chart of an example process for analyzing and/or mitigating dropped packets.

FIG. 4 is a flow chart of an example process for analyzing and/or mitigating dropped packets. In some implementations, one or more process blocks of FIG. 4 may be performed by a control device (e.g., control device 210). In some implementations, one or more process blocks of FIG. 4 may be performed by another device or a group of devices separate from or including the control device, such as a network device (e.g., network device 230), and/or one or more network operator devices.

As shown in FIG. 4, process 400 may include subscribing to receive data from a network device (block 410). For example, the control device 210 (e.g., using dropped packet analytics component 220, processor 310, memory 315, storage component 320, input component 325, communication interface 335, and/or the like) may subscribe to receive data from a network device, as described above in connection with FIGS. 1A-1C.

As further shown in FIG. 4, process 400 may include receiving the data from the network device based on subscribing to receive the data from the network device, wherein the data is associated with a plurality of packets that have been dropped by the network device, and wherein the data includes a first descriptor based on a type of packet drop associated with a packet of the plurality of packets that have been dropped by the network device, and one or more second descriptors based on a packet flow associated with the plurality of packets that have been dropped by the network device (block 420). For example, the control device 210 (e.g., using dropped packet analytics component 220, processor 310, memory 315, storage component 320, input component 325, communication interface 335, and/or the like) may receive the data from the network device based on subscribing to receive the data from the network device, as described above in connection with FIGS. 1A-1C. In some implementations, the data is associated with a plurality of packets that have been dropped by the network device. In some implementations, the data includes a first descriptor based on a type of packet drop associated with a packet of the plurality of packets that have been dropped by the network device, and one or more second descriptors based on a packet flow associated with the plurality of packets that have been dropped by the network device.

As further shown in FIG. 4, process 400 may include determining a dropped packet profile associated with the network device, wherein the dropped packet profile is based on the first descriptor and the one or more second descriptors (block 430). For example, the control device 210 (e.g., using dropped packet analytics component 220, processor 310, memory 315, storage component 320, and/or the like) may determine a dropped packet profile associated with the network device, as described above in connection with FIGS. 1A-1C. In some implementations, the dropped packet profile is based on the first descriptor and the one or more second descriptors.

As further shown in FIG. 4, process 400 may include generating a first notification based on the dropped packet profile associated with the network device (block 440). For example, the control device 210 (e.g., using dropped packet analytics component 220, processor 310, memory 315, storage component 320, and/or the like) may generate the first notification based on the dropped packet profile associated with the network device, as described above in connection with FIGS. 1A-1C.

As further shown in FIG. 4, process 400 may include transmitting the first notification to cause an action to be performed based on the first notification (block 450). For example, the control device 210 (e.g., using dropped packet analytics component 220, processor 310, memory 315, storage component 320, output component 330, communication interface 335, and/or the like) may transmit the first notification to cause an action to be performed based on the first notification, as described above in connection with FIGS. 1A-1C.

Process 400 may include additional implementations, such as any single implementation or any combination of implementations described below and/or described with regard to any other process described herein.

In some implementations, the first descriptor may indicate whether the type of packet drop is attributed to a network error, a network outage, a routing error, a policy error, a firewall error, a transmission error, a cable deficiency, a deficiency in hardware, a deficiency in software, a deficiency in binding, a deficiency in packet labeling, or a deficiency in packet encapsulation. In some implementations, the one or more second descriptors may include one or more of a source identifier, a source port identifier, a destination identifier, a destination port identifier, a next hop identifier, or a protocol identifier.

In some implementations, process 400 may further include determining that additional data is needed based on analyzing the dropped packet profile, querying the network device to obtain the additional data, and receiving the additional data. In some implementations, determining that the additional data is needed based on analyzing the dropped packet profile may include performing a lookup in a rules repository to determine a type of the additional data that is needed.

In some implementations, the additional data may include a first list of network devices routing the plurality of packets that have been dropped by the network device to the network device, a second list of network devices implementing the packet flow associated with the plurality of packets that have been dropped by the network device, and/or a third list of network devices inserting labels, headers, or identifiers associated with the plurality of packets that have been dropped by the network device.

In some implementations, process 400 may further include correlating the first list of network devices, the second list of network devices, or the third list of network devices and the dropped packet profile to determine a cause associated with dropping of the plurality of packets that have been dropped by the network device, generating a second notification identifying the cause for the dropping of plurality of packets that have been dropped by the network device, and transmitting the second notification to permit a corrective action to be performed to address the cause for the dropping of the plurality of packets that have been dropped by the network device. In some implementations, the second notification may include the corrective action to be performed.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
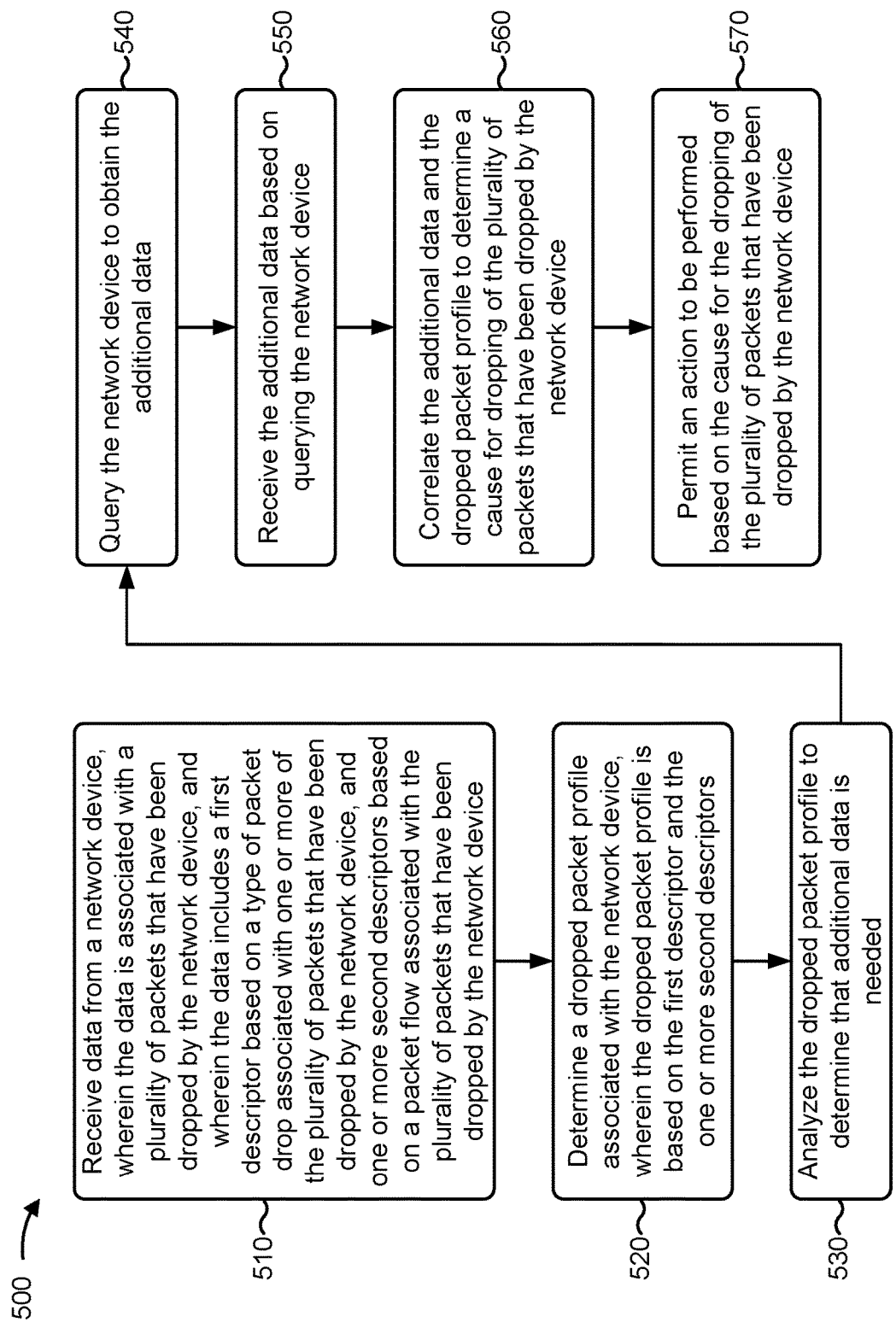
FIG. 5 is a flow chart of an example process for analyzing and/or mitigating dropped packets.

FIG. 5 is a flow chart of an example process for analyzing and/or mitigating dropped packets. In some implementations, one or more process blocks of FIG. 5 may be performed by control device 210 (e.g., control device 210). In some implementations, one or more process blocks of FIG. 5 may be performed by another device or a group of devices separate from or including the control device, such as a network device (e.g., network device 230), and/or one or more network operator devices.

As shown in FIG. 5, process 500 may include receiving data from a network device, wherein the data is associated with a plurality of packets that have been dropped by the network device, and wherein the data includes a first descriptor based on a type of packet drop associated with one or more of the plurality of packets that have been dropped by the network device, and one or more second descriptors based on a packet flow associated with the plurality of packets that have been dropped by the network device (block 510). For example, the control device 210 (e.g., using dropped packet analytics component 220, processor 310, memory 315, storage component 320, input component 325, communication interface 335, and/or the like) may receive the data from the network device, as described above in connection with FIGS. 1A-1C. In some implementations, the data is associated with a plurality of packets that have been dropped by the network device. In some implementations, the data includes a first descriptor based on a type of packet drop associated with one or more of the plurality of packets that have been dropped by the network device, and one or more second descriptors based on a packet flow associated with the plurality of packets that have been dropped by the network device.

As further shown in FIG. 5, process 500 may include determining a dropped packet profile associated with the network device, wherein the dropped packet profile is based on the first descriptor and the one or more second descriptors (block 520). For example, the control device 210 (e.g., using dropped packet analytics component 220, processor 310, memory 315, storage component 320, and/or the like) may determine a dropped packet profile, as described above in connection with FIGS. 1A-1C. In some implementations, the dropped packet profile is based on the first descriptor and the one or more second descriptors.

As further shown in FIG. 5, process 500 may include analyzing the dropped packet profile to determine that additional data is needed (block 530). For example, the control device 210 (e.g., using dropped packet analytics component 220, processor 310, memory 315, storage component 320, and/or the like) may analyze the dropped packet profile to determine that additional data is needed, as described above in connection with FIGS. 1A-1C.

As further shown in FIG. 5, process 500 may include querying the network device to obtain the additional data (block 540). For example, the control device 210 (e.g., using dropped packet analytics component 220, processor 310, memory 315, storage component 320, input component 325, output component 330, communication interface 335, and/or the like) may query the network device to obtain the additional data, as described above in connection with FIGS. 1A-1C.

As further shown in FIG. 5, process 500 may include receiving the additional data based on querying the network device (block 550). For example, the control device 210 (e.g., using dropped packet analytics component 220, processor 310, memory 315, storage component 320, input component 325, communication interface 335, and/or the like) may receive the additional data based on querying the network device, as described above in connection with FIGS. 1A-1C.

As further shown in FIG. 5, process 500 may include correlating the additional data and the dropped packet profile to determine a cause for dropping of the plurality of packets that have been dropped by the network device (block 560). For example, the control device 210 (e.g., using dropped packet analytics component 220, processor 310, memory 315, storage component 320, and/or the like) may correlate the additional data and the dropped packet profile to determine the cause for dropping of the plurality of packets that have been dropped by the network device, as described above in connection with FIGS. 1A-1C.

As further shown in FIG. 5, process 500 may include permitting an action to be performed based on the cause for the dropping of the plurality of packets that have been dropped by the network device (block 570). For example, the control device 210 (e.g., using dropped packet analytics component 220, processor 310, memory 315, storage component 320, output component 330, communication interface 335, and/or the like) may permit an action to be performed based on the cause for the dropping of the plurality of packets that have been dropped by the network device, as described above in connection with FIGS. 1A-1C.

Process 500 may include additional implementations, such as any single implementation or any combination of implementations described below and/or described with regard to any other process described herein.

In some implementations, the first descriptor may indicate whether the type of packet drop is attributed to a network error, a network outage, a routing error, a policy error, a firewall error, a transmission error, a cable deficiency, a deficiency in hardware, a deficiency in software, a deficiency in binding, a deficiency in packet labeling, or a deficiency in packet encapsulation. In some implementations, the one or more second descriptors may include one or more of a source identifier, a source port identifier, a destination identifier, a destination port identifier, a next hop identifier, or a protocol identifier.

In some implementations, the additional data may include a first list of network devices that routed the plurality of packets that have been dropped by the network device to the network device, a second list of network devices that implemented the packet flow associated with the plurality of packets that have been dropped by the network device, and/or a third list of network devices that inserted labels, headers, or identifiers associated with the plurality of packets that have been dropped by the network device.

In some implementations, process 500 may further include generating a notification identifying the cause for the dropping of the plurality of packets that have been dropped by the network device and transmitting the notification to cause a corrective action to be performed to address the cause for the dropping of the plurality of packets that have been dropped by the network device. In some implementations, the notification may include the corrective action to be performed. In some implementations, the corrective action may include disabling or bypassing the network device. In some implementations, the corrective action may include identifying a deficient network device and routing traffic to bypass the deficient network device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
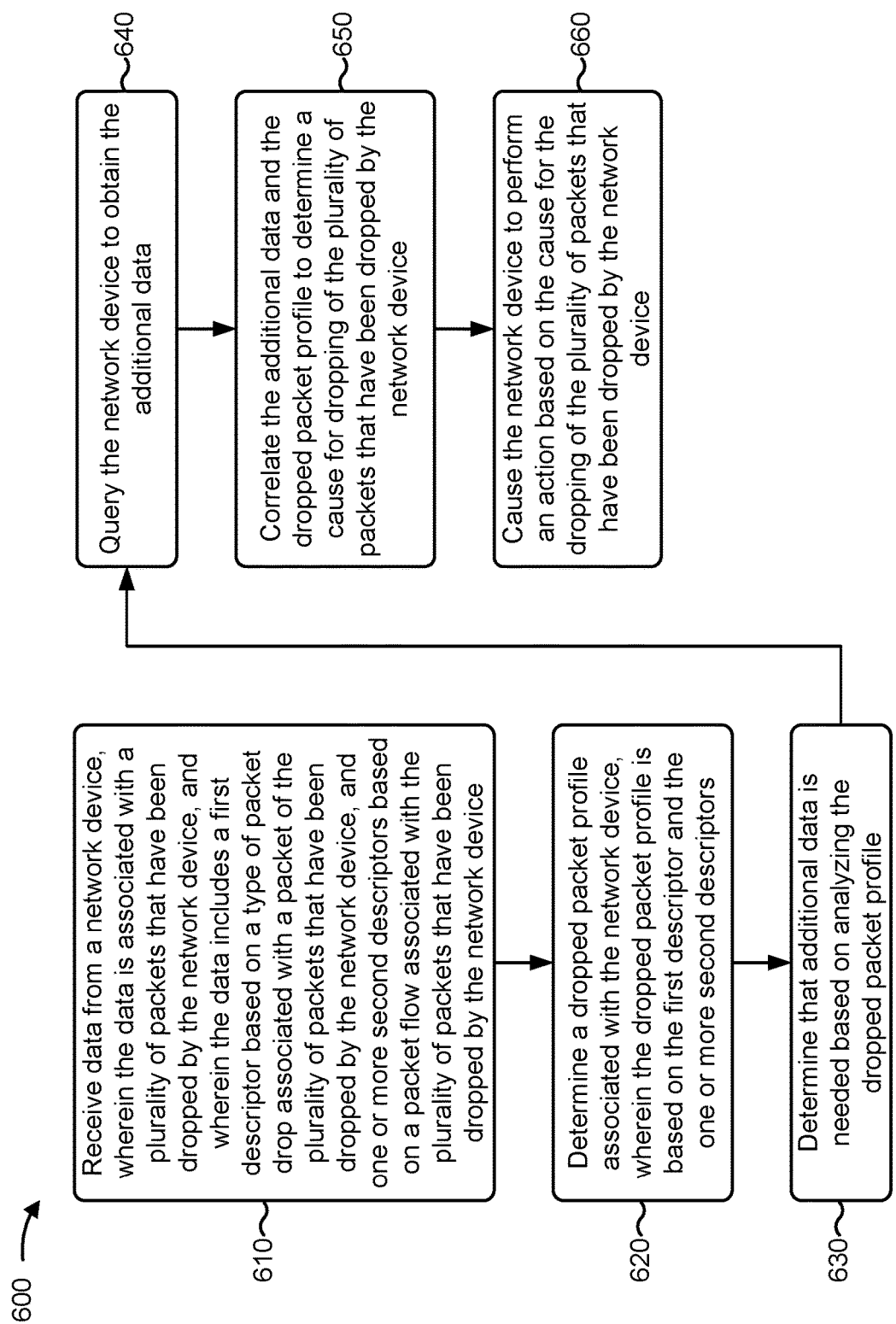
FIG. 6 is a flow chart of an example process for analyzing and/or mitigating dropped packets.

FIG. 6 is a flow chart of an example process for analyzing and/or mitigating dropped packets. In some implementations, one or more process blocks of FIG. 6 may be performed by a control device (e.g., control device 210). In some implementations, one or more process blocks of FIG. 6 may be performed by another device or a group of devices separate from or including the control device, such as a network device (e.g., network device 230), and/or one or more network operator devices.

As shown in FIG. 6, process 600 may include receiving data from a network device, wherein the data is associated with a plurality of packets that have been dropped by the network device, and wherein the data includes a first descriptor based on a type of packet drop associated with a packet of the plurality of packets that have been dropped by the network device, and one or more second descriptors based on a packet flow associated with the plurality of packets that have been dropped by the network device (block 610). For example, the control device 210 (e.g., using dropped packet analytics component 220, processor 310, memory 315, storage component 320, input component 325, communication interface 335, and/or the like) may receive the data from the network device, as described above in connection with FIGS. 1A-1C. In some implementations, the data is associated with a plurality of packets that have been dropped by the network device. In some implementations, the data includes a first descriptor based on a type of packet drop associated with each of the plurality of packets that have been dropped by the network device, and one or more second descriptors based on a packet flow associated with the plurality of packets that have been dropped by the network device.

As further shown in FIG. 6, process 600 may include determining a dropped packet profile associated with the network device, wherein the dropped packet profile is based on the first descriptor and the one or more second descriptors (block 620). For example, the control device 210 (e.g., using dropped packet analytics component 220, processor 310, memory 315, storage component 320, and/or the like) may determine the dropped packet profile associated with the network device, as described above in connection with FIGS. 1A-1C. In some implementations, the dropped packet profile is based on the first descriptor and the one or more second descriptors.

As further shown in FIG. 6, process 600 may include determining that additional data is needed based on analyzing the dropped packet profile (block 630). For example, the control device 210 (e.g., using dropped packet analytics component 220, processor 310, memory 315, storage component 320, and/or the like) may determine that additional data is needed based on analyzing the dropped packet profile, as described above in connection with FIGS. 1A-1C.

As further shown in FIG. 6, process 600 may include querying the network device to obtain the additional data (block 640). For example, the control device 210 (e.g., using dropped packet analytics component 220, processor 310, memory 315, storage component 320, output component 330, communication interface 335, and/or the like) may query the network device to obtain the additional data, as described above in connection with FIGS. 1A-1C.

As further shown in FIG. 6, process 600 may include correlating the additional data and the dropped packet profile to determine a cause for dropping of the plurality of packets that have been dropped by the network device (block 650). For example, the control device 210 (e.g., using dropped packet analytics component 220, processor 310, memory 315, storage component 320, and/or the like) may correlate the additional data and the dropped packet profile to determine a cause for the dropping of the plurality of packets that have been dropped by the network device, as described above in connection with FIGS. 1A-1C.

As further shown in FIG. 6, process 600 may include causing the network device to perform an action based on the cause for the dropping of the plurality of packets that have been dropped by the network device (block 660). For example, the control device 210 (e.g., using dropped packet analytics component 220, processor 310, memory 315, storage component 320, output component 330, communication interface 335 and/or the like) may cause the network device to perform an action based on the cause for the dropping of the plurality of packets that have been dropped by the network device, as described above in connection with FIGS. 1A-1C.

Process 600 may include additional implementations, such as any single implementation or any combination of implementations described below and/or described with regard to any other process described herein.

In some implementations, process 600 may further include performing a lookup in a rules repository to determine a type of the additional data that is needed. In some implementations, process 600 may further include generating a first notification based on the dropped packet profile for the network device and transmitting the first notification to cause a first action to be performed based on the first notification. In some implementations, process 600 may further include generating a second notification identifying the cause for the dropping of the plurality of packets that have been dropped by the network device and transmitting the second notification. In some implementations, the second notification may include a corrective action to be performed to address the cause for the dropping of the plurality of packets that have been dropped by the network device.

In some implementations, process 600 may further include instructing a network operator device to disable or bypass the network device. In some implementations, process 600 may further include identifying a deficient network device or link and instructing a network operator device to route traffic to bypass the deficient network device or link.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In this way, implementations described herein may correlate a type of packet drop with a packet flow for packets that have been dropped by a network device 230 of a network 240, and a control device 210 may determine and mitigate the cause for the dropping of the packets by network device 230. Detecting, correlating, and mitigating packets being dropped from network device 230 improves quality of service in network 240, improves end-to-end performance, reduces delays in network 240, improves network efficiency, reduces or prevents losses in communications, reduces or prevents data errors in the network, and/or the like.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

The foregoing disclosure provides illustration and description but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Additionally, as used herein, the articles "a" and "an" are intended to include one or more items and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Additionally, as used herein, the terms "has," "have," "having," or the like are intended to be open-ended terms. Further, the phrase "based on" is intended to mean, "based, at least in part, on" unless explicitly stated otherwise.

What is claimed is:

1. A method, comprising:
   subscribing, by a control device, to receive data from a network device based on an occurrence of an event,
      wherein the event includes a packet being dropped by the network device;
   receiving, by the control device, the data from the network device based on subscribing to receive the data from the network device and based on the occurrence of the event,
      wherein the data is associated with a plurality of packets that have been dropped by the network device,
      wherein the packet is one of the plurality of packets, and
      wherein the data includes:
         a first descriptor based on a type of packet drop associated with the packet dropped by the network device, and
         one or more second descriptors based on a packet flow associated with the plurality of packets dropped by the network device;
   inputting, by the control device, the first descriptor and the one or more second descriptors into a model;
   comparing, by the control device and using the model, the first descriptor and the one or more second descriptors;
   determining, by the control device and based on comparing the first descriptor and the one or more second descriptors, a dropped packet profile associated with the network device;
   generating, by the control device, a first notification based on the dropped packet profile associated with the network device; and
   transmitting, by the control device, the first notification to cause an action to be performed based on the first notification.

2. The method of claim 1, wherein the first descriptor indicates whether the type of packet drop is attributed to at least one of a network error, a network outage, a routing error, a policy error, a firewall error, a transmission error, a cable deficiency, a deficiency in hardware, a deficiency in software, a deficiency in binding, a deficiency in packet labeling, or a deficiency in packet encapsulation.

3. The method of claim 1, wherein the one or more second descriptors include one or more of a source identifier, a source port identifier, a destination identifier, a destination port identifier, a next hop identifier, or a protocol identifier.

4. The method of claim 1, further comprising:
determining that additional data is needed based on analyzing the dropped packet profile;
querying the network device to obtain the additional data; and
receiving the additional data.

5. The method of claim 4, wherein determining that the additional data is needed based on analyzing the dropped packet profile comprises:
performing a lookup in a rules repository to determine a type of the additional data that is needed.

6. The method of claim 4, wherein the additional data includes at least one of:
a first list of network devices routing the plurality of packets dropped by the network device to the network device,
a second list of network devices implementing the packet flow associated with the plurality of packets dropped by the network device, or
a third list of network devices inserting labels, headers, or identifiers associated with the plurality of packets dropped by the network device.

7. The method of claim 6, further comprising:
correlating the first list of network devices, the second list of network devices, or the third list of network devices and the dropped packet profile to determine a cause for dropping of the plurality of packets dropped by the network device;
generating a second notification identifying the cause for the dropping of the plurality of packets dropped by the network device,
wherein the second notification includes a corrective action to be performed to address the cause for the dropping of the plurality of packets dropped by the network device; and
transmitting the second notification to permit the corrective action to be performed.

8. A device, comprising:
one or more memories; and
one or more processors to:
subscribe to receive data from a network device based on an occurrence of an event,
wherein the event includes a packet being dropped by the network device;
receive, based on the occurrence of the event, the data from the network device,
wherein the data is associated with a plurality of packets dropped by the network device,
wherein the packet is one of the plurality of packets, and
wherein the data includes:
a first descriptor based on a type of packet drop associated with one or more of the plurality of packets dropped by the network device, and
one or more second descriptors based on a packet flow associated with the plurality of packets dropped by the network device;
input the first descriptor and the one or more second descriptors into a model;
compare, using the model, the first descriptor and the one or more second descriptors;
determine, based on comparing the first descriptor and the one or more second descriptors, a dropped packet profile associated with the network device;
analyze the dropped packet profile to determine that additional data is needed;
query the network device to obtain the additional data;
receive the additional data based on querying the network device;
correlate the additional data and the dropped packet profile to determine a cause for dropping of the plurality of packets dropped by the network device; and
permit an action to be performed based on the cause for the dropping of the plurality of packets dropped by the network device.

9. The device of claim 8, wherein the first descriptor indicates whether the type of packet drop is attributed to at least one of a network error, a network outage, a routing error, a policy error, a firewall error, a transmission error, a cable deficiency, a deficiency in hardware, a deficiency in software, a deficiency in binding, a deficiency in packet labeling, or a deficiency in packet encapsulation.

10. The device of claim 8, wherein the one or more second descriptors include one or more of a source identifier, a source port identifier, a destination identifier, a destination port identifier, a next hop identifier, or a protocol identifier.

11. The device of claim 8, wherein the additional data includes at least one of:
a first list of network devices that routed the plurality of packets dropped by the network device, to the network device,
a second list of network devices that implemented the packet flow associated with the plurality of packets dropped by the network device, or
a third list of network devices that inserted labels, headers, or identifiers associated with the plurality of packets dropped by the network device.

12. The device of claim 8, wherein the one or more processors are further to:
generate a notification identifying the cause for the dropping of the plurality of packets dropped by the network device,
wherein the notification includes a corrective action to be performed to address the cause for the dropping of the plurality of packets dropped by the network device; and
transmit the notification to cause the corrective action to be performed.

13. The device of claim 12, wherein the corrective action includes disabling or bypassing the network device.

14. The device of claim 12, wherein the corrective action includes identifying a deficient network device and routing traffic to bypass the deficient network device.

15. A non-transitory computer-readable medium storing instructions, the instructions comprising:
one or more instructions that, when executed by one or more processors, cause the one or more processors to:
subscribe to receive data from a network device based on an occurrence of an event,
wherein the event includes a packet being dropped by the network device;
receive, based on the occurrence of the event, the data from the network device,
wherein the data is associated with a plurality of packets dropped by the network device, and wherein the packet is one of a plurality of packets, wherein the data includes:
  a first descriptor based on a type of packet drop associated with the packet of the plurality of packets dropped by the network device, and
  one or more second descriptors based on a packet flow associated with the plurality of packets dropped by the network device;
input the first descriptor and the one or more second descriptors into a model;
compare, using the model, the first descriptor and the one or more second descriptors;
determine, based on comparing the first descriptor and the one or more second descriptors, a dropped packet profile associated with the network device;
determine that additional data is needed based on analyzing the dropped packet profile;
query the network device to obtain the additional data;
correlate the additional data and the dropped packet profile to determine a cause for dropping of the plurality of packets dropped by the network device; and
cause the network device to perform an action based on the cause for the dropping of the plurality of packets dropped by the network device.

16. The non-transitory computer-readable medium of claim 15, wherein the one or more instructions, when executed by the one or more processors, further cause the one or more processors to:
  perform a lookup in a rules repository to determine a type of the additional data that is needed.

17. The non-transitory computer-readable medium of claim 15, wherein the one or more instructions, when executed by the one or more processors, further cause the one or more processors to:
  generate a first notification based on the dropped packet profile for the network device; and
  transmit the first notification to cause a first action to be performed based on the first notification.

18. The non-transitory computer-readable medium of claim 17, wherein the one or more instructions, when executed by the one or more processors, further cause the one or more processors to:
  generate a second notification identifying the cause for the dropping of the plurality of packets dropped by the network device,
    wherein the second notification includes a corrective action to be performed to address the cause for the dropping of the plurality of packets dropped by the network device; and
  transmit the second notification.

19. The non-transitory computer-readable medium of claim 15, wherein the one or more instructions, when executed by the one or more processors, further cause the one or more processors to:
  instruct a network operator device to disable or bypass the network device.

20. The non-transitory computer-readable medium of claim 15, wherein the one or more instructions, when executed by the one or more processors, further cause the one or more processors to:
  identify a deficient network device or link; and
  instruct a network operator device to route traffic to bypass the deficient network device or link.

* * * * *